Nov. 22, 1949     N. PENSABENE     2,488,827
MAGNETIC COUPLING
Filed July 3, 1945
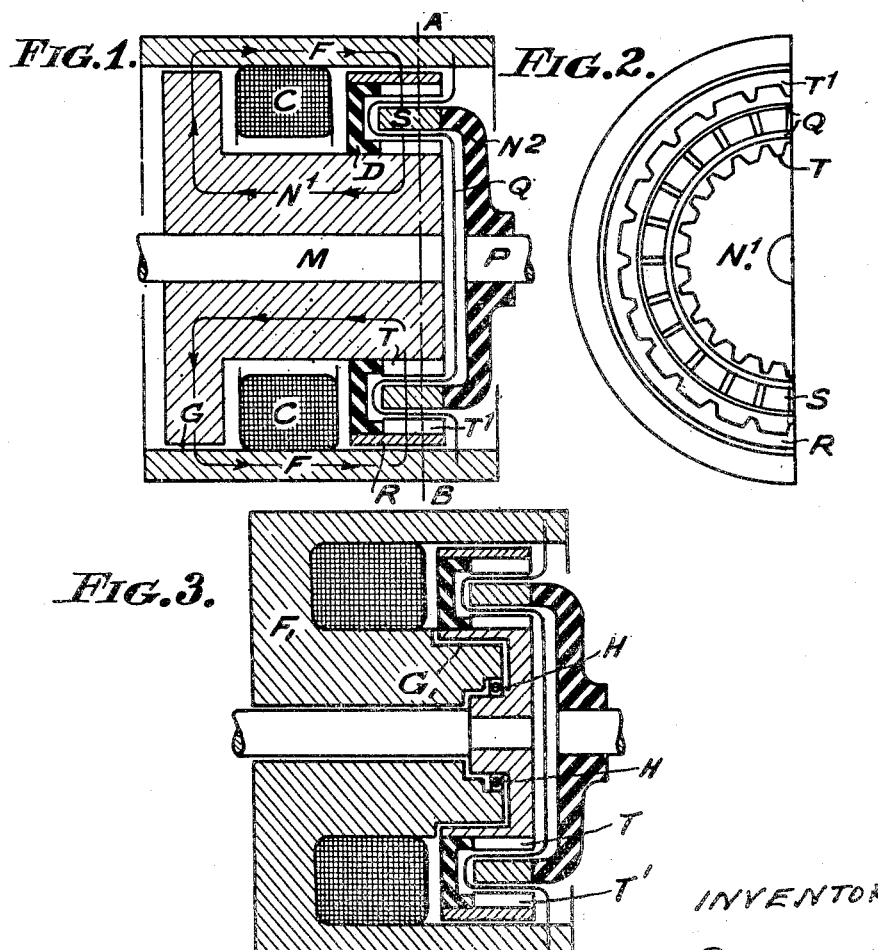
INVENTOR.
NICOLO PENSABENE Patented Nov. 22, 1949

2,488,827

UNITED STATES PATENT OFFICE 2,488,827

MAGNETIC COUPLING

Nicolo Pensabene, Bridgewater, England, assignor to Sealed Motors Corporation, New York, N. Y.

Application July 3, 1945, Serial No. 603,000
In Great Britain July 6, 1944

4 Claims. (Cl. 172—284)

1

This invention relates to magnetic couplings for transmitting rotary motion from one shaft, gearing-element or the like to another shaft, gearing-element or the like which is separated from the first by a shroud forming part of a fluid-tight enclosure.

The magnetic coupling according to the invention is of the known type in which the coupling members are formed with magnetized projections or teeth which face one another across an air gap through which the shroud extends, the coupling being thus adapted to transmit a torque produced by the tangential component of the magnetic attraction across the gap and to convey a rotary motion without slip so long as the maximum torque obtainable by means of the magnetic attraction of the projections or teeth is not exceeded.

The object of the invention is to provide an improved or simplified magnetic coupling of the type referred to, designed to transmit a large torque in relation to the size of the electromagnet employed for magnetizing the coupling members.

The invention comprises a magnetic coupling of the type referred to for transmitting rotary motion between two shafts or elements or the like separated from one another by a shroud forming part of the fluid-tight enclosure, wherein a series of more than two coupling members are arranged to form a number of air gaps arranged in series in the magnetic circuit of a stationary electromagnet and are provided with projections or teeth facing one another across the gaps, alternate coupling members being fixed to the same shaft or gearing-element so that the total torque transmitted is equal to the sum of the torques produced by the tangential component of the magnetic attraction across each of the gaps.

In one form of the invention, the coupling members are located in an annular gap formed between opposite pole faces of a fixed annular magnet. In another form of the invention, the coupling members provided with the magnetized projections or teeth are arranged to be magnetized by an annular magnet which is divided into two parts, one of which is fixed and carries the exciting winding, while the other is mounted for rotation with one of the coupling members and carries the magnetized projections or teeth thereof.

In order to avoid eddy currents and to reduce the magnetic potential drop across the gap or gaps between the coupling members and the non-

2 rotating magnet (or between the two parts of the magnet when one part of the magnet is rotatable relatively to the other), the surfaces which face one another across these gaps must be made smooth and continuous. The magnetized projections and/or teeth of the coupling members may conveniently be radially disposed; but inclined teeth or teeth arranged parallel to the axis of rotation may be used to advantage.

One embodiment of the invention will now be described with reference to the drawings accompanying the provisional specification, in which:

Figure 1 is a diagrammatic longitudinal sectional view of the coupling for a submerged, totally enclosed electric motor driving a bore hole pump and subject to high pressure from water outside, and Figure 2 is a diagrammatic cross-sectional view thereof taken along the line A—B of Figure 1.

Figure 3 is a diagrammatic longitudinal sectional view of another embodiment of the invention.

Referring first to Figures 1 and 2 of the drawings, a magnetic core N' is fixed to the motor shaft M and is provided with teeth T at one end and an air gap G at the other. In addition to these teeth, another set of teeth T', fixed on an iron ring R, is provided. This ring R is fixed to the core N' by means of a ring D made of non-magnetic material. Between the two sets of teeth the second member $N^2$ of the coupling is placed as shown and fixed to the shaft P of the pump. This member, made of non-magnetic material, carries iron strips S in any suitable manner. For example, it can be made of brass or bronze with inserts or iron strips. The magnetic circuit is completed by a stationary cylinder F which supports a stationary coil C. It will be seen that the flux will close itself around the coil by passing through the gap G, entering the ring R, bridging the teeth T' and T through the iron strips S. The path of the flux is shown by the line with arrows. A shroud, made of thin material, is shown in section by the curve marked Q and is fixed to the stationary cylinder F, thus completing the enclosure of the motor, its bearings and the exciting coil. Each side of this strip, facing the teeth, is subject to a tangential pull, which gives rise to the transmitting torque between the two members of the coupling. In Figure 2 the section of the coupling in the plane AB is shown.

It is clear that the gap G can be placed in any position desired in the magnetic circuit. For example, in the embodiment shown in Figure 3, a drum type coupling is shown having the two members with the teeth T and T' revolving between the poles of an annular stationary magnet $F_1$ like the first embodiment, but in this embodiment the gap $G_1$ is placed at the end of the inner cylindrical portion of the magnet as shown. The advantage of this design consists in the provision of a steadying bearing H supported by the magnet. Otherwise the drawing is self-explanatory.

I claim:

1. A magnetic coupling comprising a rotatable field magnet, a stationary field magnet mounted coaxially with said rotatable field magnet and completing the magnetic circuit thereof, at least one exciting coil mounted on said stationary field magnet, an annular air gap between said stationary and rotatable field magnets, at least one annular coupling member mounted rotatably in said air gap and having magnetisable teeth, at least two rings of magnetisable teeth fixed to said rotatable magnet, air gaps between each of said rings of teeth and said coupling member and a shroud extending through all said last-mentioned air gaps.

2. A magnetic coupling comprising a fixed field coil, a driving member and a driven member rotatably mounted coaxially with said coil; at least one annular coupling member attached to one of said driving and driven members; and at least two annular coupling members attached to the other of said driving and driven members and co-operating with said first-mentioned coupling member to form at least two annular gaps arranged in series in the magnetic circuit of said coil, said coupling members having magnetizable teeth facing one another across said gaps and effective for transmitting torque by magnetic attraction across each of said gaps; and a shroud extending through said gaps.

3. A magnetic coupling comprising a stationary field magnet having opposed annular pole faces forming an annular air gap; a stationary exciting coil for said magnet; at least three annular coupling members rotatably mounted in said gap and separated from one another so that there are at least two air gaps between said coupling members; magnetizable teeth on said coupling members facing one another across each of the air gaps between said coupling members; and a shroud extending through said last-mentioned air gaps.

4. A magnetic coupling comprising a fixed support, a fixed annular coil supported by the support, a driving member rotatable within the coil, a driven member coaxial with the driving member, at least one annular coupling member attached to one of the members, at least two annular coupling members attached to the other member and bounding at least two annular gaps arranged in series in the magnetic circuit of the coil, and a shroud fixed to the support and extending through the gaps.

NICOLO PENSABENE.

REFERENCES CITED

The following references are of record in the file of this patent:

UNITED STATES PATENTS

| Number | Name | Date |
| --- | --- | --- |
| 700,839 | Sessions | May 27, 1902 |
| 1,084,148 | Huguenin | Jan. 13, 1914 |
| 1,233,569 | Graemiger | July 17, 1917 |
| 1,271,401 | Weydell | July 2, 1918 |
| 1,298,375 | Neuland | Mar. 25, 1919 |
| 1,422,243 | Van Norden | July 11, 1922 |
| 1,457,475 | Van Norden | June 5, 1923 |
| 1,568,305 | Williams | Jan. 5, 1926 |
| 1,702,755 | Weydell | Feb. 19, 1929 |